W. MADDISON, DEC'D.
S. E. MADDISON, ADMINISTRATRIX.
MICROMETER GAGE.
APPLICATION FILED MAY 19, 1919.

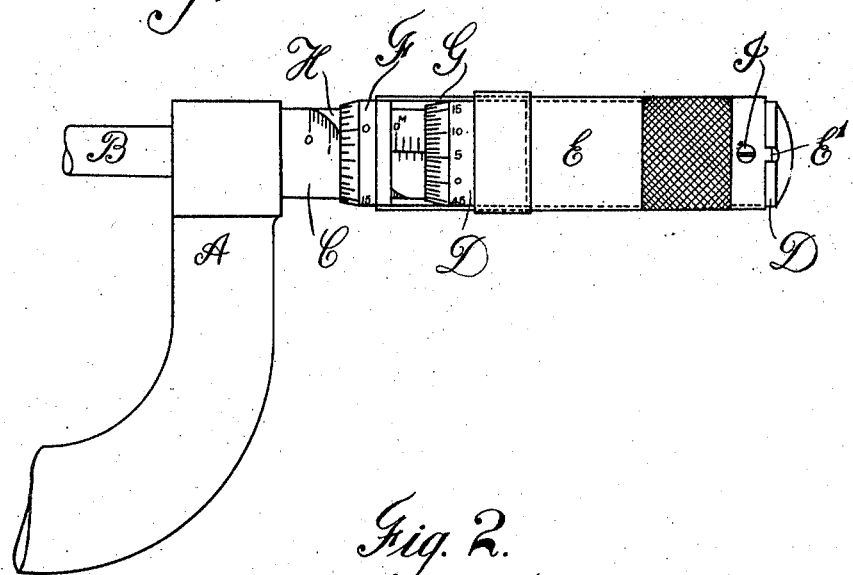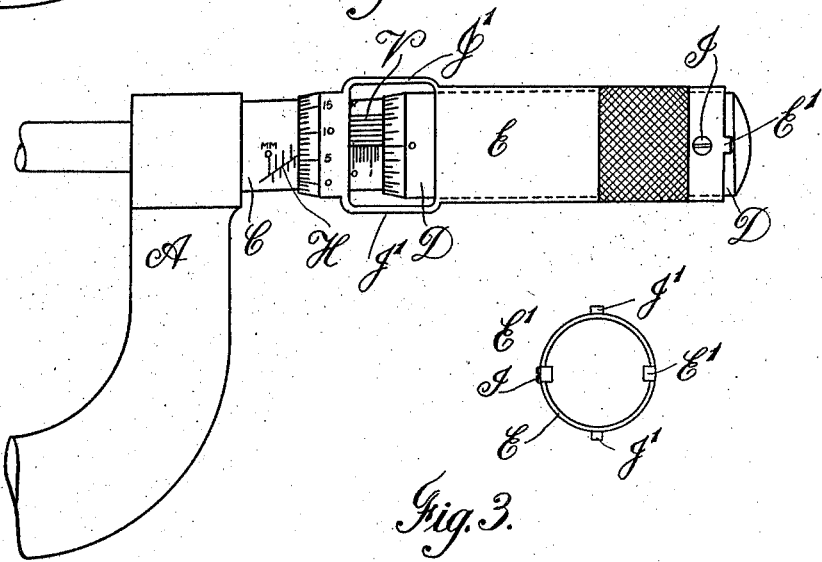

1,315,318.

Patented Sept. 9, 1919.
2 SHEETS—SHEET 2.

Inventor:
Walter Maddison, Decd.
Sarah E. Maddison, Administratrix.

UNITED STATES PATENT OFFICE.

WALTER MADDISON, DECEASED, LATE OF LONDON, ENGLAND, BY SARAH ELIZABETH MADDISON, ADMINISTRATRIX, OF LONDON, ENGLAND.

MICROMETER-GAGE.

1,315,318.  Specification of Letters Patent.  Patented Sept. 9, 1919.

Application filed May 19, 1919. Serial No. 298,262.

*To all whom it may concern:*

Be it known that I, SARAH ELIZABETH MADDISON, a subject of the King of England, residing at 155 Holmleigh road, Stamford Hill, London, N. 16, England, am the administratrix of the estate of WALTER MADDISON, deceased, formerly of the same address, who invented a new and useful Improvement in Micrometer-Gages, of which the following is a specification.

This invention relates to micrometer gages of the type enabling measurements to be made individually in either the metric or English system or simultaneously in both systems, involving the use of but one measuring screw of a pitch consistent with the system more generally in vogue.

More particularly the invention relates to a micrometer gage of the above kind which includes a thimble additional to the ordinary one and a graduated datum line on the fixed guide socket additional to the ordinary datum line. Gages of this type are already known which have a graduated thimble on and in addition to the ordinary thimble, and an additional scale or graduated datum line on the fixed guide socket of the measuring screw, to be used in conjunction with the additional thimble, the object being to enable one to read on a single instrument measurements according to more than one different system of calibration. Further, in at least one case the additional scale or graduated line on the guide socket is of helical form but employed in conjunction with an index fixed to the ordinary U-block. In this latter case, however, the additional thimble is quite separate from the ordinary thimble but arranged to turn and to slide thereon and the index is also additional and therefore the device involves the employment of an additional piece of mechanism capable of being moved independently of the ordinary thimble, and more over the equivalent measurement desired in fractions of the one unit of measurement can only be obtained after the approximate measure of the object in the other unit has been first adjusted by means of a second scale on the fixed guide socket, and therein is more complicated than and different from mine.

The principle of his invention involves:—
Firstly—

(a) The use of a measuring screw in the metric system of such a pitch of thread as to be readily subdivisable into fractions closely equivalent to convenient fractions in the English system.

(b) The use of a measuring screw in the English system of such a pitch of thread as to be readily subdivisable into fractions closely equivalent to convenient fractions in the metric system.

Secondly—

The elimination of the aforementioned difference between the fractions by the methods set forth and hereafter explained. Having ascertained the object and the principles of his invention I will now describe how it is carried into effect.

Referring to the drawings:—

Figure 1 shows the measuring part of an external measuring micrometer with a metric measuring essentially in compliance with his invention.

Fig. 2 is a similar view of a slightly modified construction.

Fig. 3 is an end view of the same.

Figure 4:
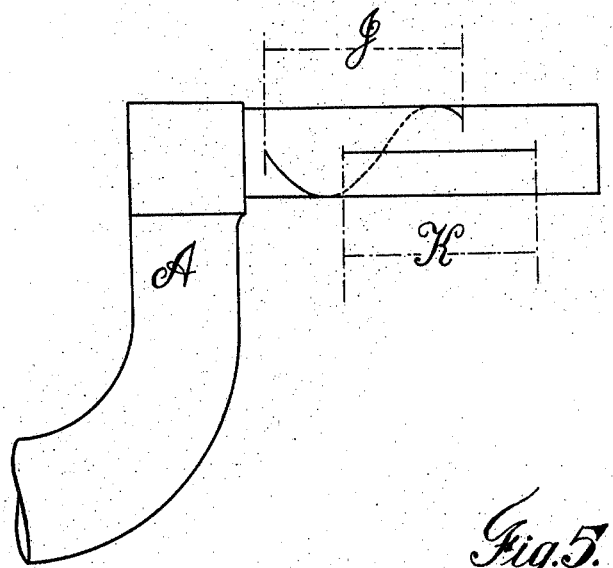
Fig. 4 is a detail view of the helical datum base.

A: shows part of the frame and B: shows part of the plain portion of the measuring screw which works through the barrel or fixed guide C: and is inclosed therein.

The pitch of the screw is 0.5 millimeter and in conjunction with the graduated thimble D: which is divided into 50 parts, measurements to 0.01 millimeter can be read.

Assuming the range of the screw to be 25 millimeters, it will require 50 revolutions of the screw to produce a travel of 25 millimeters which differs from 1 inch by an amount of 0.4 millimeter, 1 inch being the greater.

To obtain English measurements according to requirements of my invention, an additional datum line H of helical form is provided on the barrel C: of a constant angle of slope that when the screw is rotated to produce a travel of 25.4 millimeters the end of the helical line strictly coincides with the zero mark on the thimble D, assuming that the two datum lines start from the same point. If this helical line be divided into 50 parts a revolution of the thimble D around the barrel C on the helical line will produce a travel of the measuring screw of 1/50 inch.

To enable smaller fractions of an inch to be read an additional thimble F is provided, essentially as part of his invention, graduated into 20 parts by means of which measurements to 0.001 inch can be read.

To obtain a smaller fraction, the 20 divisions are subdivided into 40 divisions, which then enables measurements to 0.0005 inch to be read.

To enable the metric datum line and the thimble D to be read, the thimble F is attached to a sleeve E of metal or any other convenient material by means of a tube of any transparent material such as celluloid or the like. The transparent tube G can be attached to the thimble F and the sleeve E by rivets, cement, screw threads or by any other convenient method.

The thimble can be embodied in one piece with E Fig. 2, in which case the graduated ring portion is attached to E by any convenient number of narrow ribs, being separate pieces attached permanently to the sleeve E and the graduated ring or forming a solid part thereof.

The sleeve E is attached to the thimble by means of a screw or pin, separately or in conjunction with some other convenient means of insuring correct alinement of the additional thimble with the helical line.

A convenient method is shown in Figs. 1, 2 and 3 in which 2 lugs formed on the end of the sleeve E engage in slots cut on the circumference of the thimble D, the longitudinal position being maintained by the screw J.

The position of the helical line H in relation to the straight datum line is arbitrary but for convenience should be placed in a position approximately as shown in Figs. 1 and 2.

To apply the principles of my invention to read parts of an inch on the straight datum line, a measuring screw of 500 threads to the inch is used.

The method of obtaining measurements to 0.0005 inch are substantially as herein set forth and described in the case of the metric screw micrometer except that the graduations on the thimbles F and D, Fig. 1 are reversed, the metric subdivisions being read on F.

As 50 revolutions of the English screw in Fig. 2 produces a travel of 1 inch or 25.4 millimeters, each revolution of the screw must have a decrement to produce in 50 revolutions a distance of 25 millimeters along the helical line which is equal to .9842 inch. This equivalent though not mathematically correct produces in practice an error so small as to be negligible. It can be eliminated in the computation of the angle of the helical line.

To enable readings to be taken of measurements finer than 0.0005 inch, a 5 space vernier V is incorporated to read to 0.0001 inch, using the 0.0005 inch divisions as the vernier base.

As the area of the 5 space vernier is less than that of the 10 space vernier in general use, there is less confusion in reading the 5 space vernier as the number of the lines can be estimated without referring to the numerals at the ends of the lines as is usual with the 10 space vernier.

Fig. 4 shows diagrammatically the two datum lines on the metric screw micrometer, J being the English line of 1 inch length and K the metric line of 25.4 millimeters length, in the direction of the axis of the barrel.

Figure 5:
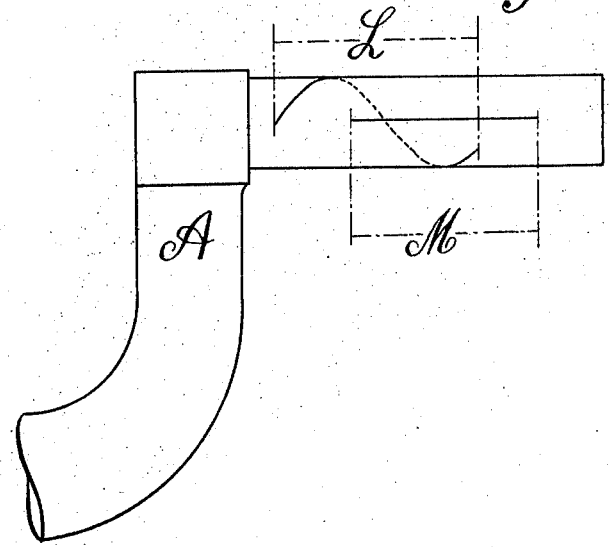
Fig. 5 is a similar view of a slightly modified construction.

Fig. 5 shows the two datum lines on the English screw micrometer L being the metric line of 25 millimeters length, and M the English line of 1 inch length in the direction of the axis of the barrel. The equivalent of 1 inch can be taken as 25.4 millimeters for all practical purposes.

I claim:

1. In a micrometer gage, a fixed guide having a graduated datum line thereon, a graduated helical datum line also located thereon, a pair of graduated thimbles respectively adapted to coöperate with said datum lines.

2. In a micrometer gage, a fixed guide, a pair of separate datum lines located thereon, a pair of screw thimbles mounted on said guide and provided with graduations respectively to coöperate with the respective datum lines on the guide, and means for moving said thimbles in unison.

In testimony whereof I affix my signature in presence of two witnesses.

SARAH ELIZABETH MADDISON,
*Administratrix of the estate of*
*Walter Maddison, deceased.*

Witnesses:
G. P. YOUNG,
A. R. J. RAMSEY.